(12) United States Patent  (10) Patent No.: US 9,208,139 B2
Madnani et al.  (45) Date of Patent: Dec. 8, 2015

(54) SYSTEM AND METHOD FOR IDENTIFYING ORGANIZATIONAL ELEMENTS IN ARGUMENTATIVE OR PERSUASIVE DISCOURSE

(71) Applicant: Educational Testing Service, Princeton, NJ (US)

(72) Inventors: Nitin Madnani, Princeton, NJ (US); Michael Heilman, Princeton, NJ (US); Joel Tetreault, Lawrenceville, NJ (US); Martin Chodorow, New York, NY (US)

(73) Assignee: Educational Testing Service, Princeton, NJ (US)

( * ) Notice: Subject to any disclaimer, the term of this patent is extended or adjusted under 35 U.S.C. 154(b) by 420 days.

(21) Appl. No.: 13/735,493

(22) Filed: Jan. 7, 2013

(65) Prior Publication Data

US 2013/0179766 A1     Jul. 11, 2013

Related U.S. Application Data

(60) Provisional application No. 61/583,445, filed on Jan. 5, 2012.

(51) Int. Cl.
*G06F 17/24* (2006.01)
*G06F 17/27* (2006.01)

(52) U.S. Cl.
CPC ............ *G06F 17/241* (2013.01); *G06F 17/279* (2013.01); *G06F 17/2765* (2013.01)

(58) Field of Classification Search
CPC ..................................................... G06F 17/241
USPC ......................................................... 715/230
See application file for complete search history.

(56) References Cited

U.S. PATENT DOCUMENTS

| | | | | |
|---|---|---|---|---|
| 5,519,608 | A * | 5/1996 | Kupiec | 704/9 |
| 7,523,085 | B2 * | 4/2009 | Nigam et al. | 706/55 |
| 8,799,773 | B2 * | 8/2014 | Reis et al. | 715/254 |
| 8,838,438 | B2 * | 9/2014 | Leary et al. | 704/9 |
| 8,862,591 | B2 * | 10/2014 | Chowdhury et al. | 707/748 |
| 2003/0138758 | A1 * | 7/2003 | Burstein et al. | 434/169 |
| 2004/0175687 | A1 * | 9/2004 | Burstein et al. | 434/353 |

(Continued)

OTHER PUBLICATIONS

Burstein, Jill, Daniel Marcu, and Kevin Knight. "Finding the WRITE stuff: Automatic identification of discourse structure in student essays." Intelligent Systems, IEEE 18, No. 1 (2003): 32-39.ystems, IEEE 18, No. 1 (2003): 32-39.*

(Continued)

*Primary Examiner* — Frank D Mills
(74) *Attorney, Agent, or Firm* — Jones Day

(57) ABSTRACT

In accordance with the teachings described herein, systems and methods are provided for identifying organizational elements in argumentative or persuasive discourse. A text that has been annotated is received. The annotated text includes argumentative or persuasive discourse that includes claims and evidence and organizational elements configured to organize the claims and evidence. Annotations of the annotated text distinguish the organizational elements from the claims and evidence. A rule set or a feature set is identified from the annotated text, where the rule set or the feature set includes textual patterns or word frequency features related to the organizational elements of the annotated text. A model is built based on the annotations and on the rule set or the feature set. The model is configured to identify organizational elements in a new text. The model is applied to the new text.

47 Claims, 8 Drawing Sheets

(56) References Cited

U.S. PATENT DOCUMENTS

| | | | |
|---|---|---|---|
| 2005/0091038 A1* | 4/2005 | Yi et al. | 704/10 |
| 2005/0125216 A1* | 6/2005 | Chitrapura et al. | 704/1 |
| 2005/0143971 A1* | 6/2005 | Burstein et al. | 704/4 |
| 2006/0149720 A1* | 7/2006 | Dehlinger | 707/3 |
| 2008/0097758 A1* | 4/2008 | Li et al. | 704/240 |
| 2008/0313180 A1* | 12/2008 | Zeng et al. | 707/6 |
| 2011/0066587 A1* | 3/2011 | Ferrucci et al. | 706/54 |
| 2011/0161067 A1* | 6/2011 | Lesher et al. | 704/1 |

OTHER PUBLICATIONS

Anand, Pranav, King, Joseph, Boyd-Graber, Jordan, Wagner, Earl, Martell, Craig, Oard, Doug, Resnik, Philip; Believe Me—We Can Do This! Annotating Persuasive Acts in Blog Text; Proceedings of AAAI Workshop on Computational Models of Natural Argument; 2011.

Carlson, Lynn, Marcu, Daniel, Okurowski, Mary Ellen; Building a Discourse-Tagged Corpus in the Framework of Rhetorical Structure Theory; Proceedings of the 2nd SlGdial Workshop on Discourse and Dialogue; 2001.

Feng, Vanessa Wei, Hirst, Graeme; Classifying Arguments by Scheme; Proceedings of the 49th Annual Meeting of the Association for Computational Linguistics; pp. 987-996; 2011.

Hutchinson, Ben; Acquiring the Meaning of Discourse Markers; Proceedings of the Association for Computational Linguistics; 2004.

Lafferty, John, McCallum, Andrew, Pereira, Fernando; Conditional Random Fields: Probabilistic Models for Segmenting and Labeling Sequence Data; Proceedings of ICML; 2001.

Mann, William, Thompson, Sandra; Rhetorical Structure Theory: Toward a Functional Theory of Text Organization; Text, 8(3); pp. 243-281; 1988.

Marcu, Daniel; The Theory and Practice of Discourse Parsing and Summarization; MIT Press; 2000.

Okazaki, Naoaki; CRFsuite: A Fast Implementation of Conditional Random Fields (CRFs); Website; 2011.

Searle, John; A Classification of Illocutionary Acts; Language in Society, 5(1); pp. 1-23; 1975.

Walton, Douglas, Reed, Christopher, Macagno, Fabrizio; Argumentation Schemes; Cambridge University Press; 2008.

* cited by examiner

SYSTEM AND METHOD FOR IDENTIFYING ORGANIZATIONAL ELEMENTS IN ARGUMENTATIVE OR PERSUASIVE DISCOURSE

CROSS-REFERENCE TO RELATED APPLICATIONS

This application claims priority to U.S. Provisional Patent Application No. 61/583,445, filed Jan. 5, 2012, entitled "Identifying High-Level Organizational Elements in Argumentative Discourse," which is herein incorporated by reference in its entirety.

FIELD

The technology described in this patent document relates generally to detection of organizational elements in argumentative or persuasive discourse and more particularly to applying a rule-based system or a probabilistic sequence model for automated identification of organizational elements in argumentative or persuasive discourse.

BACKGROUND

When presenting an argument or attempting to persuade an audience, a writer or speaker generally cannot simply state a list of claims and pieces of evidence. Rather, the speaker or writer must generally structure the claims and pieces of evidence and explain how they relate to an opponent's argument. Thus, argumentative or persuasive discourse may include not only language expressing the claims and evidence but also language used to organize the claims and evidence.

SUMMARY

In accordance with the teachings described herein, systems and methods are provided for identifying organizational elements in argumentative or persuasive discourse. In a method for identifying organizational elements in argumentative or persuasive discourse, a text that has been annotated is received. The annotated text includes argumentative or persuasive discourse that includes claims and evidence and organizational elements configured to organize the claims and evidence. Annotations of the annotated text distinguish the organizational elements from the claims and evidence. A rule set or a feature set is identified from the annotated text, where the rule set or the feature set includes textual patterns or word frequency features related to the organizational elements of the annotated text. A model is built based on the annotations and on the rule set or the feature set. The model is configured to identify organizational elements in a new text. The model is applied to the new text.

A system for identifying organizational elements in argumentative or persuasive discourse includes a data processor and computer-readable memory in communication with the data processor encoded with instructions for commanding the data processor to execute steps. The steps include receiving text that has been annotated, where the annotated text includes argumentative or persuasive discourse that includes claims and evidence and organizational elements configured to organize the claims and evidence. Annotations of the annotated text distinguish the organizational elements from the claims and evidence. The steps also include identifying a rule set or a feature set from the annotated text, where the rule set or the feature set include textual patterns or word frequency features related to the organizational elements of the annotated text. The steps further include building a model based on the annotations and on the rule set or the feature set, where the model is configured to identify organizational elements in a new text. The model is applied to the new text.

A non-transitory computer-readable storage medium for identifying organizational elements in argumentative or persuasive discourse, where the computer-readable medium includes computer executable instructions which, when executed, cause the computer system to execute steps. The steps include receiving text that has been annotated, where the annotated text includes argumentative or persuasive discourse that includes claims and evidence and organizational elements configured to organize the claims and evidence. Annotations of the annotated text distinguish the organizational elements from the claims and evidence. The steps also include identifying a rule set or a feature set from the annotated text, where the rule set or the feature set include textual patterns or word frequency features related to the organizational elements of the annotated text. The steps further include building a model based on the annotations and on the rule set or the feature set, where the model is configured to identify organizational elements in a new text. The model is applied to the new text.

DETAILED DESCRIPTION

Figure 1A:
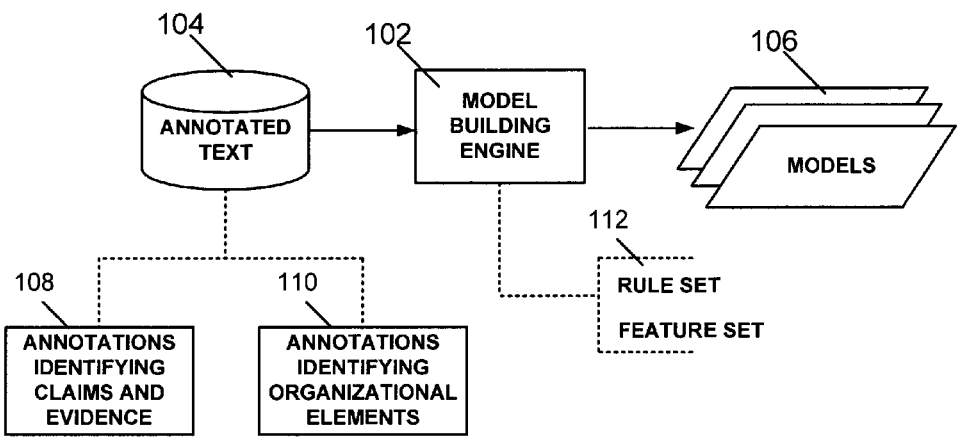
FIG. 1A is a block diagram illustrating an example model building engine used to build one or more models, where the one or more models are configured to identify organizational elements in argumentative or persuasive discourse.

FIG. 1A is a block diagram illustrating an example model building engine 102 used to build one or more models 106, where the one or more models 106 are configured to identify organizational elements in argumentative or persuasive discourse. In FIG. 1A, the model building engine 102 receives annotated text 104, where the annotated text 104 includes argumentative or persuasive discourse. The annotated text 104 may include, for example, statements from a political debate, arguments from a legal brief or motion, or sentences from an essay rebutting an opponent's argument. The argumentative or persuasive discourse of the annotated text 104 includes not only language expressing claims and evidence but also language used to organize the claims and evidence (i.e., organizational elements). The annotated text 104 includes annotations identifying the claims and evidence 108 and annotations identifying the organizational elements 110 of the text 104. In one example, the annotations 108, 110 are carried out by humans experienced in scoring argumentative or persuasive writing. In another example, the annotations 108, 110 are carried out by computer hardware or software configured to annotate text in this manner. Further, the annotated text 104 may be annotated solely to distinguish the organizational elements from the claims and evidence, or alternatively, the annotated text 104 may be annotated to include these annotations 108, 110 and a variety of others (e.g., annotating the text to identify thesis statements and conclusion statements).

Annotations 108, 110 of the type illustrated in FIG. 1A reflect the fact that argumentative or persuasive discourse includes not only language expressing the claims and evidence (i.e., the "meat" of the argument) but also language used to organize the claims and evidence (i.e., the "shell" of the argument). Differentiating between the claims and evidence and the organizational elements may be used for a variety of applications, including those that focus on the content of arguments (e.g., relation extraction) and those that focus on the structure of arguments (e.g., automated essay scoring). Detecting organizational elements may also be a first step in parsing an argument to infer its structure. Further applications may be in the fields of political science (e.g., to better understand political debates), information extraction (e.g., to help a system focus on content rather than organization), and automated essay scoring (e.g., to analyze the quality of a test-taker's argument).

The model building engine 102 receives the annotated text 104 and identifies a rule set or a feature set 112 from the annotated text 104. The rule set or the feature set 112 may include textual patterns or word frequency features from the annotated text 104, where the textual patterns or the word frequency features are related to the organizational elements of the text 104. An example textual pattern (i.e., rule) may include parts of speech or word identifiers in a specific sequence (e.g., "I [modal verb] [agree verb] with the [author noun]."). An example word frequency feature may identify a relative frequency of a word in a text corpus (e.g., for a word appearing in the text 104, a word frequency feature may be related to the word's relative frequency in the British National Corpus). The model building engine 102 builds the one or more models 106 based on the annotations 108, 110 and on the rule set or feature set 112, where the one or more models 106 are configured to identify organizational elements in a new text (i.e., an unlabeled text that has not been annotated). The one or more models 106 may function at the word level to identify whether each individual word of the new text is an organizational element and may focus on explicit markers of organizational structure in arguments of the new text. The one or more models 106 may include a rule-based model, a probabilistic sequence model, or a model that combines the rule-based and sequence model approaches.

Figure 1B:
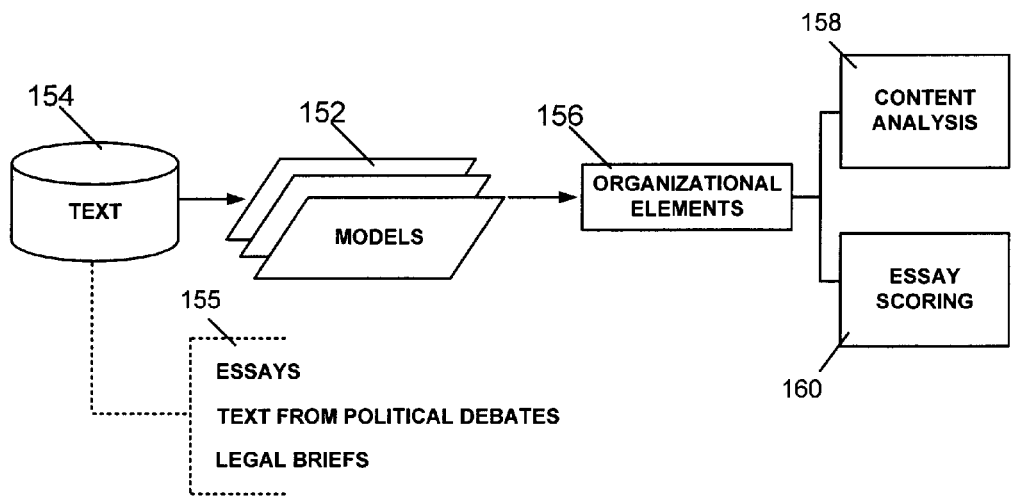
FIG. 1B illustrates one or more example models being applied to a new, unlabeled (i.e., not annotated) text.

FIG. 1B illustrates one or more example models 152 being applied to a new, unlabeled (i.e., not annotated) text 154. The one or more models 152 may be similar to the one or more models 106 of FIG. 1A and may be configured to identify organizational elements 156 of the new text 154. The text 154 includes argumentative or persuasive discourse and may include essays, text from political debates, and legal briefs 155, among other types of argumentative or persuasive discourse. The organizational elements 156 identified in the new text 154 may be processed for further applications, including content analysis applications 158 and essay scoring applications 160.

In identifying the organizational elements 156, the one or more models 152 may be applied in a variety of manners. In one example, a most likely sequence of labels given the words of the new text 154 is identified using Viterbi decoding, where the sequence of labels includes binary values indicating whether each word of the new text 154 is an organizational element. In another example, a word of the new text 154 is labeled as an organizational element if a marginal probability associated with the word exceeds a threshold value.

Figure 2:
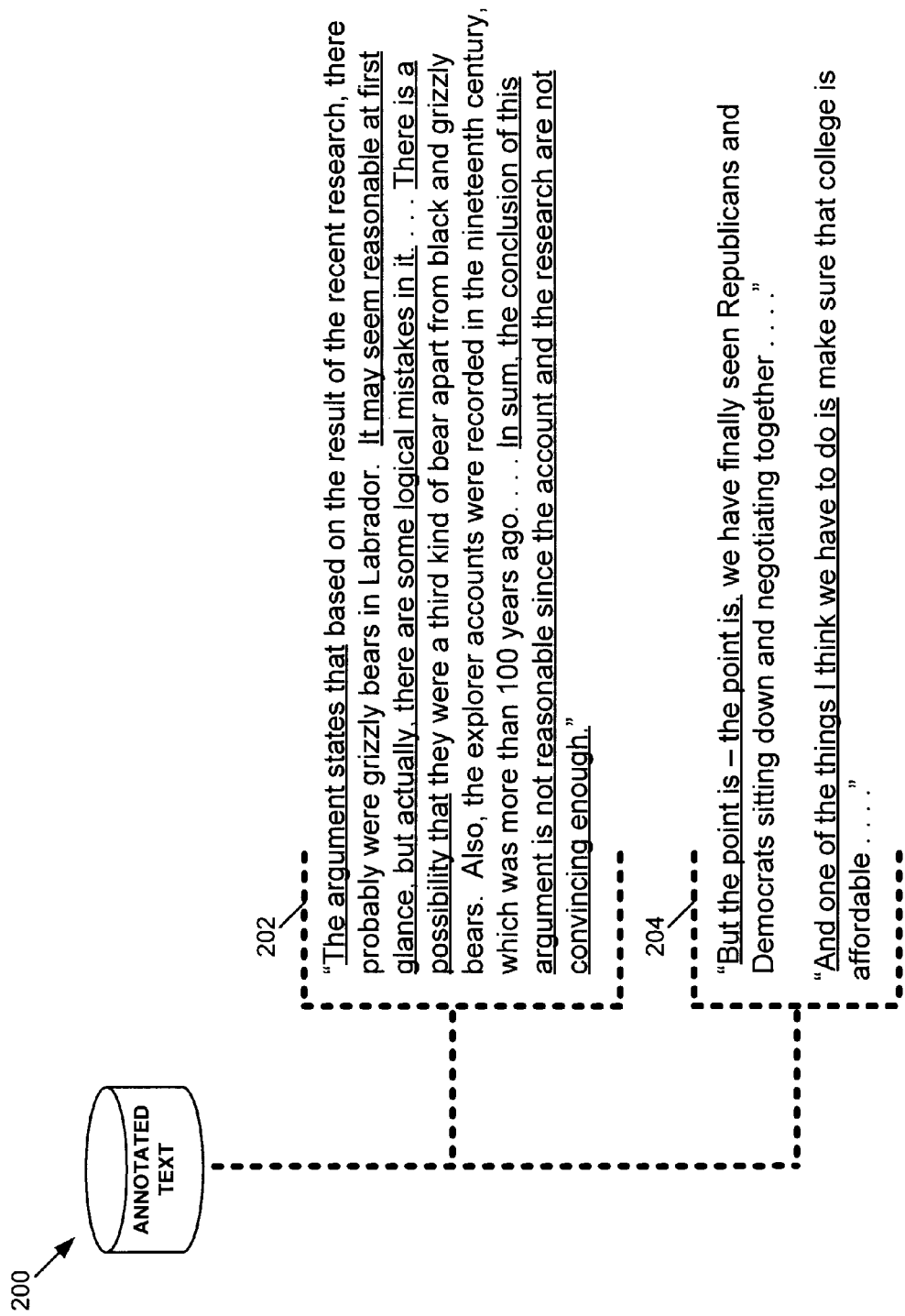
FIG. 2 depicts example annotated text used to build a model for identifying organizational elements in argumentative or persuasive discourse.

FIG. 2 depicts example annotated text 200 used to build a model for identifying organizational elements in argumentative or persuasive discourse. As described above with respect to FIGS. 1A and 1B, persuasive or argumentative discourse includes organizational elements and claims and evidence, where the organizational elements are words or sequences of words used to refer to the claims and evidence and to provide an organizational framework for the argument. The organizational elements may be used by a writer or speaker in a variety of ways, including (1) declaring one's own claims (e.g., "There is the possibility that . . . "); (2) restating an opponent's claims (e.g., "The argument states that . . . "); (3) evaluating an opponent's claims (e.g., "It may seem reasonable at first glance, but actually, there are some logical mistakes in it."); and (4) presenting evidence and relating it to specific claims (e.g., "To illustrate my point, I will now give the example of . . . ").

In building a model to identify such organizational elements, annotated text is received, where the annotated text includes annotations used to distinguish organizational elements from claims and evidence of the text. The annotated text 200 of FIG. 2 illustrates an example of annotations that are received and used in building the model. Text 202 is from an essay rebutting an opponent's statement that grizzly bears lived in a specific region of Canada. The underlined portion of the text 202 is text that has been identified as including organizational elements, and the portion that has not been underlined includes the claims and evidence of the persuasive or argumentative discourse: "The argument states that based on the result of the recent research, there probably were grizzly bears in Labrador. It may seem reasonable at first glance, but actually, there are some logical mistakes in it . . . . There is a possibility that they were a third kind of bear apart from black and grizzly bears. Also, the explorer accounts were recorded in the nineteenth century, which was more than 100 years ago . . . . In sum, the conclusion of this argument is not reasonable since the account and the research are not convincing enough."

Text 204 includes text from a political debate, with the underlining again being an annotation indicating that the underlined text includes an organizational element: "But the point is—the point is, we have finally seen Republicans and Democrats sitting down and negotiating together . . . . And one of the things I think we have to do is make sure that college is affordable."

The text 200 may be annotated by a human (e.g., by individuals experienced in scoring persuasive writing, with or without formal guidelines being provided by another) or by a computer (e.g., hardware or software configured to annotate text to distinguish organizational elements from claims and evidence in persuasive or argumentative discourse). In one example, annotations in the annotated text 200 are made at the word level, such that a determination is made as to whether each individual word is an organizational element or not.

Figure 3:
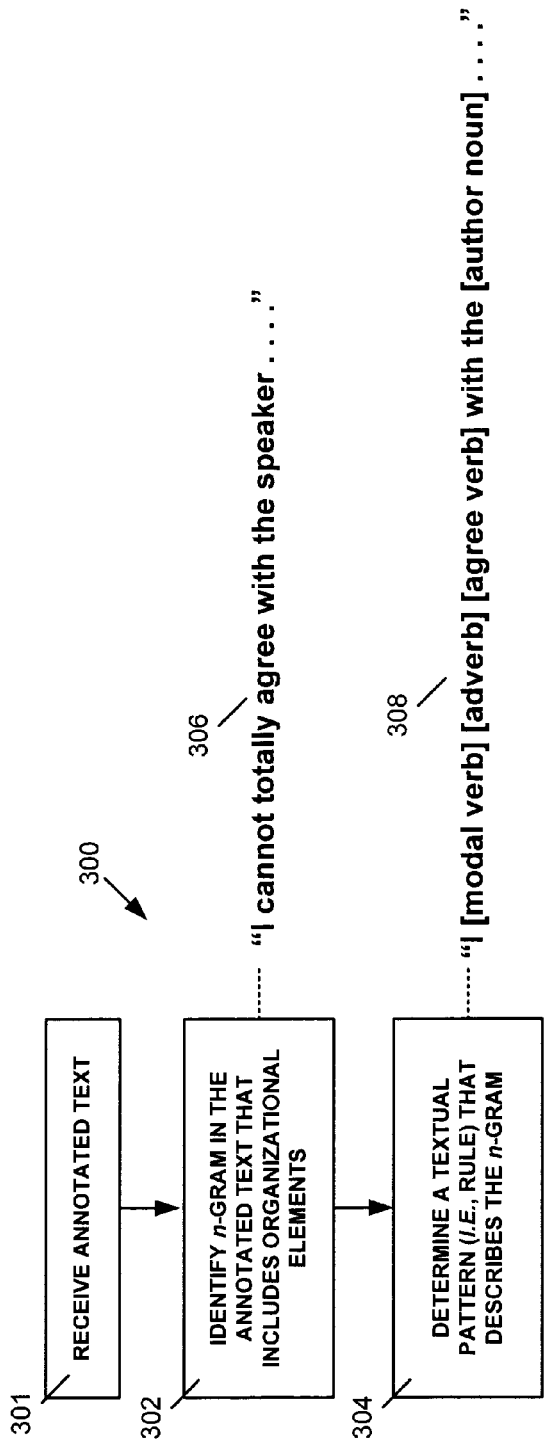
FIG. 3A illustrates example steps used in identifying a rule set from annotated text, where the rule set is used in building a model configured to identify organizational elements in argumentative or persuasive discourse.
FIG. 3B depicts an example textual pattern (i.e., rule) that recognizes organizational elements describing an author's position with respect to an opponent's opinion.

FIG. 3A illustrates example steps 300 used in identifying a rule set from annotated text, where the rule set is used in building a model configured to identify organizational elements in argumentative or persuasive discourse. As described above with respect to FIG. 1A, a model-building engine may receive annotated text and identify a rule set from the annotated text, where the rule set includes textual patterns (i.e., rules) related to organizational elements of the annotated text. The model built based on the rule set and the textual patterns may thus be used in implementing a rule-based system for identifying organizational elements in persuasive or argumentative discourse.

At 301, annotated text is received. Annotations of the annotated text distinguish organizational elements from claims and evidence of the text. At 302, an n-gram that includes organizational elements is identified in the annotated text. The n-gram is a contiguous sequence of n items (e.g., n words) from the annotated text that is identified based on the annotations. An example n-gram including organizational elements is illustrated at 306: "I cannot totally agree with the speaker . . . . " At 304, a textual pattern that describes the n-gram is determined. The textual pattern is an abstraction of the n-gram that includes parts of speech or word identifiers in a specific sequence. An example textual pattern that describes the example n-gram at 306 is illustrated at 308: "I [modal verb] [adverb] [agree verb] with the [author noun] . . . . " The textual pattern may function as a "rule," where sequences of text that satisfy the constraints of the rule may be determined to include organizational elements. Although the steps 300 describe identifying a single n-gram and a single textual pattern, in practice, lists of frequent n-grams may be identified from the annotated text, with n=1, 2, . . . , 9, for example. Multiple textual patterns (i.e., rules) may be computed to recognize the organizational elements present in the lists of frequent n-grams. Because the textual patterns are abstractions of the n-grams, a single textual pattern may describe more than one n-gram in the lists of n-grams.

FIG. 3B depicts an example textual pattern (i.e., rule) 360 that recognizes organizational elements describing an author's position with respect to an opponent's opinion. The textual pattern 360 is as follows: "I [modal verb] [adverb] [agree verb] with the [author noun] . . . . " Example modal verbs 352 include "do," "don't," "can," "cannot," "will," and "would." Example adverbs 354 include "strongly," "totally," "fundamentally," and "vehemently." Example agree verbs 356 include "disagree," "agree," and "concur." Example author nouns 358 include "writer," "author," and "speaker." In one example of the rule-based system, twenty-five (25) textual patterns are identified from annotated text (i.e., annotated essays, where the essays were produced by test-takers of a standardized test). In a model, the textual patterns of the rule set are applied to new text, where sequences of the new text that satisfy the constraints of the textual patterns may be determined to include organizational elements.

Figure 4:
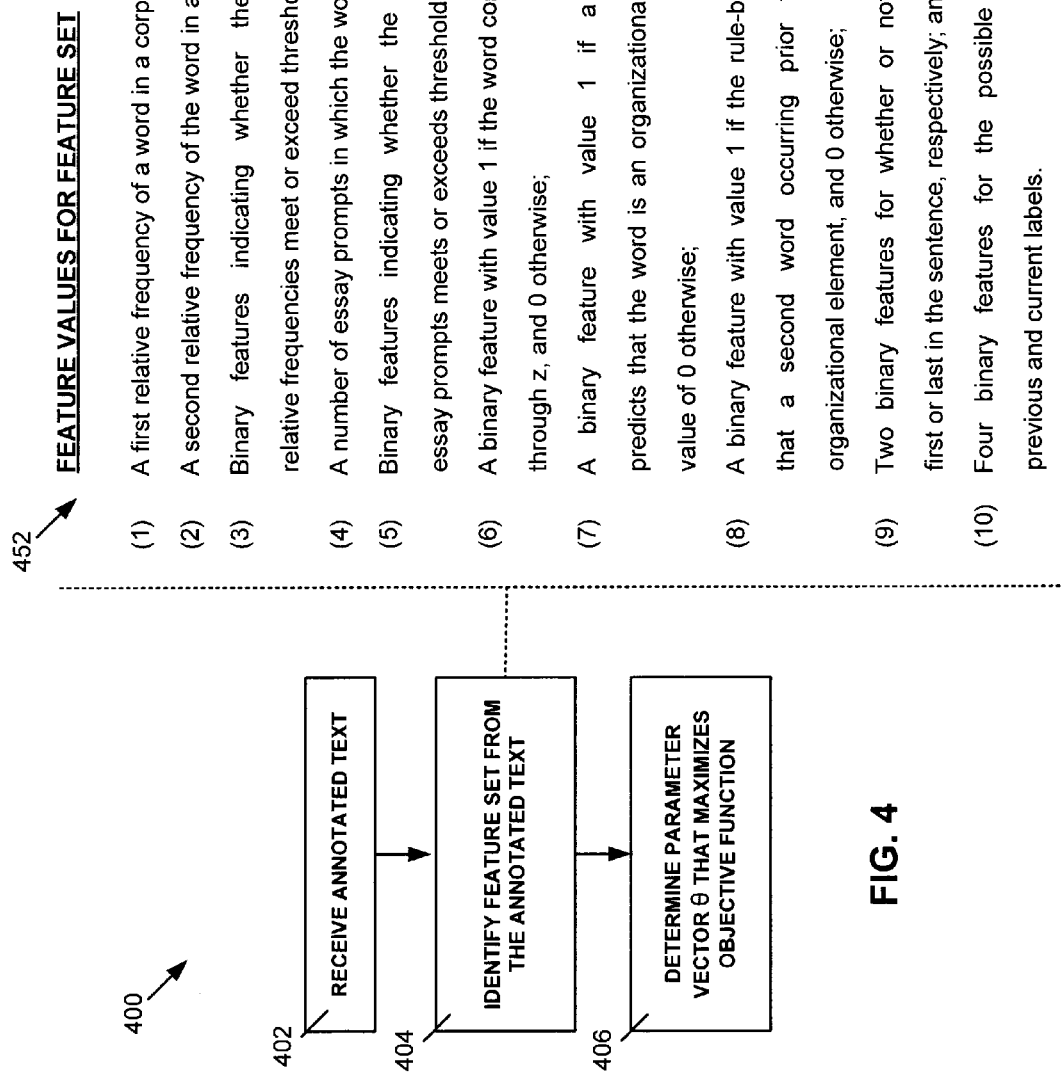
FIG. 4 is a flowchart including example steps used in building a model to identify organizational elements based on a feature set identified from an annotated text.

FIG. 4 is a flowchart 400 including example steps used in building a model to identify organizational elements based on a feature set identified from an annotated text. At 402, an annotated text is received. The annotated text may be a labeled dataset of N examples (w, y) indexed by i, containing sequences of words $w^i$ and sequences of labels $y^i$, with individual words and labels indexed by j. $y^i$ is a sequence of binary values, indicating whether each word $w_j^i$ in the sequence is an organizational element ($y_j^i=1$) or not ($y_j^i=0$).

At 404, a feature set is identified from the annotated text, where the feature set includes word frequency features or other features. In one example, the feature set may include a number of feature values, where the feature values for the jth word and label pair of the annotated text are as follows:

(1) A first relative frequency of $w_j^i$ in a corpus (e.g., the British National Corpus);

(2) A second relative frequency of $w_j^i$ in a set of essays (e.g., 100,000 essays);

(3) Binary features indicating whether the first and second relative frequencies meet or exceed one or more thresholds (e.g., thresholds of $10^{\{-6, -5, -4, -3\}}$);

(4) A number of different essay prompts in which $w_j^i$ appeared;

(5) Binary features indicating whether the number of different essay prompts meets or exceeds one or more thresholds (e.g., thresholds of {0.25, 0.50, 0.75});

(6) A binary feature with value 1 if $w_j^i$ consists of only letters a-z, and 0 otherwise (i.e., a feature to distinguish punctuation and numbers from other tokens);

(7) A binary feature with value 1 if a rule-based system (e.g., the rule-based system described with respect to FIGS. 3A and 3B) predicts that $w_j^i$ is an organizational element, and with a value of 0 otherwise;

(8) A binary feature with value 1 if the rule-based system predicts that $w_{j-1}^i$ is an organizational element, and 0 otherwise;

(9) Two binary features for whether or not the current token was the first or last in the sentence, respectively; and

(10) Four binary features for the possible transitions between previous and current labels ($y_j^i$ and $y_{j-1}^i$ respectively).

Feature values (1)-(10) are summarized at 452 of FIG. 4. In building the model, f is a feature function that takes pairs of word and label sequences from the annotated text and returns a vector of feature values. To compute the values of f for a sequence of words and labels, the feature values (1)-(10) above are summed over all elements of a sequence. Building a model based on features (1)-(10) combines a rule-based system and a probabilistic sequence model, as certain of the features utilize the rule-based system within the context of the probabilistic sequence model. In other examples, certain of features (1)-(10) are not used, and as such, a model may be based on a single feature of features (1)-(10) or multiple of the features in various combinations. Further, in certain example systems, the features of (1)-(10) that are based on the rule-based system are not used.

At 406, a parameter vector θ that maximizes the following objective function is determined:

$$L(\theta \mid w, y) = \sum_{i=1}^{N} p_\theta(y^i \mid w^i),$$

$$L(\theta \mid w, y) = \sum_{i=1}^{N} (\theta^T f(w^i, y^i) - \log Z),$$

where a normalization constant Z sums over all possible label sequences. The vector of feature values f is equal in dimensions to the number of parameters in θ. The vector θ may be viewed as including weighting factors for the values of vector f.

The parameter vector θ and the function $p_\theta$ are used in implementing the model configured to identify organizational elements in a new text. Building the model in this manner may be used in implementing a supervised, probabilistic sequence model based on conditional random fields (CRFs). Determining the parameter vector θ and the function $p_\theta$ is thus used to define a probability distribution based on the rule set or the feature set.

Figure 5:
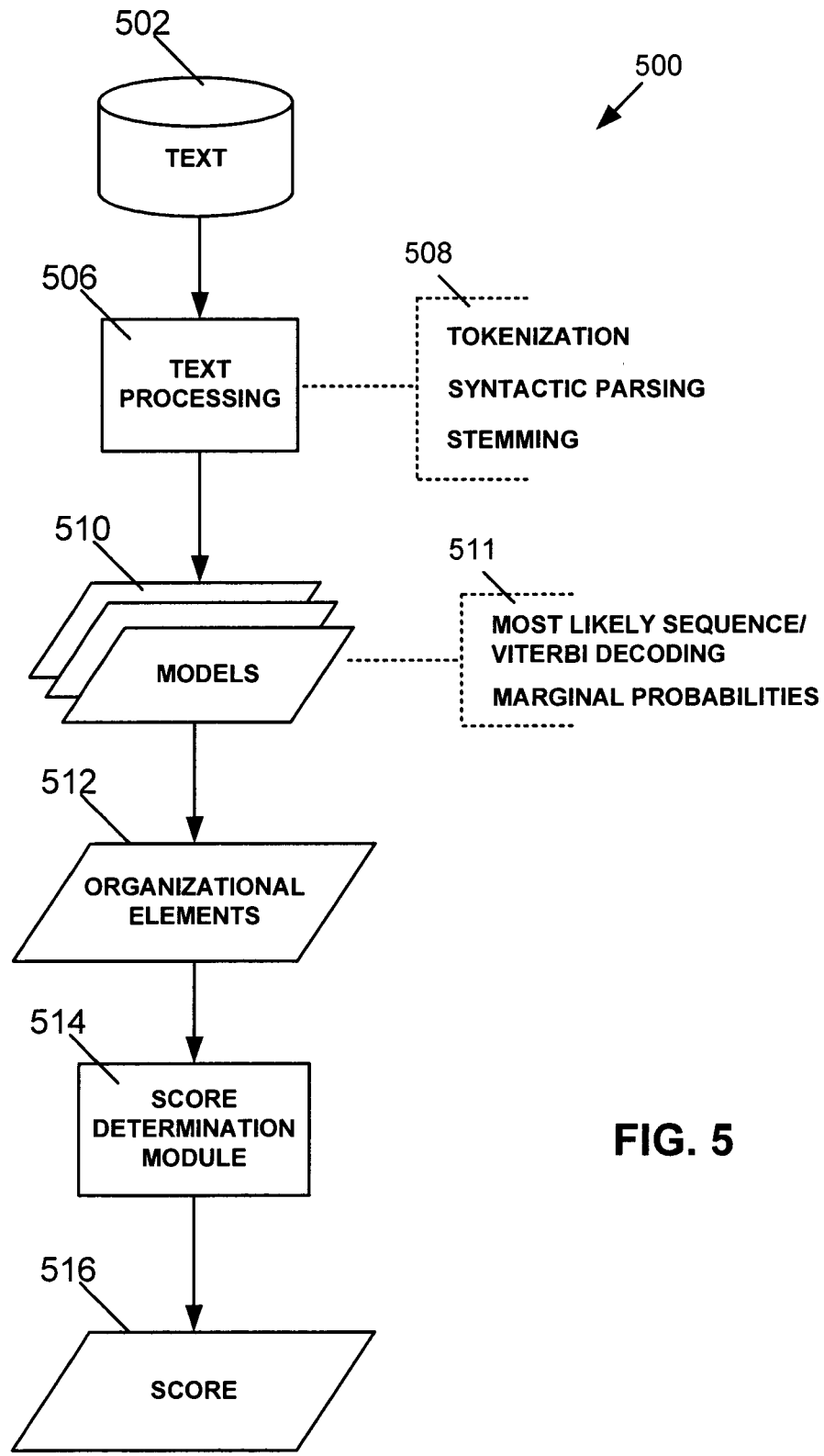
FIG. 5 depicts an example system for applying a model to a new, unlabeled text, where the model is configured to identify organizational elements in the new text.

FIG. 5 depicts an example system 500 for applying a model to a new, unlabeled text 502, where the model is configured to identify organizational elements in the new text 502. The system 500 is thus configured to make predictions about the new, unlabeled text 502, where the predictions may include binary values indicating whether each word of the new text 502 is an organizational element. In FIG. 5, the new text 502 is received by a text processing unit 506. The text processing unit 506 may be configured to perform a variety of text processing applications on the new text 502, including tokenization, syntactic parsing, and stemming 508, among others. The text processing is used to prepare the new text 502 for further processing in one or more models 510.

The one or more models 510 may include multiple models that utilize different model types. The one or more models 510 may include a rule-based model (e.g., as described above with respect to FIGS. 3A and 3B), a supervised sequence model (e.g., as described above with respect to FIG. 4), or a combination of these models or others (e.g., the supervised sequence model of FIG. 4 that includes features determined based on the rule-based model of FIGS. 3A and 3B).

Various of the one or more models 510 may also allow a particular model to be applied to the new text 502 in a variety of methods 511 (e.g., methods using most likely sequences determined with Viterbi decoding and methods based on marginal probabilities, as described in further detail below). For example, multiple of the one or more models 510 may implement the supervised sequence model, but these models may be distinguishable in their application of the supervised sequence model. When making predictions $\hat{y}^i$ about a sentence in the new text 502, one method of applying the supervised sequence model is to find a most likely sequence of labels y given the words $w^i$ of the new text 502 using Viterbi decoding:

$$\hat{y}^i = \operatorname*{argmax}_{y} p_\theta(y \mid w^i),$$

where $y^i$ includes predictions about the words $w^i$ of the new text 502, the predictions being binary values indicating whether each of the words $w^i$ are organizational elements, and $p_\theta$ is a function determined based on a feature set identified from annotated training data (e.g., the function $p_\theta$ defined above with respect to FIG. 4). In an example, variables of the preceding equation are defined consistently with the variables defined above with respect to FIG. 4. The $p_\theta$ function may vary based on the features used in the feature set (e.g., the feature set may include features based on the rule-based system or not). In one example, an $l_2$ penalty on the magnitude of $\theta$ in the function $p_\theta$ may be implemented.

An alternative method of applying the supervised sequence model to the new text 502 labels each word as an organizational element if the sum of the probabilities of all paths in which the word was labeled as an organizational element (i.e., the marginal probability) exceeds some threshold $\lambda$. Words are not labeled as organizational elements otherwise (i.e., they are identified as being claims or evidence). Specifically, an individual word $w_j^i$ is labeled as an organizational element (i.e., $y_j^i = 1$) according to the following equation:

$$\hat{y}_j^i = 1\left(\left(\sum_y p_\theta(y \mid w^i) 1(y_j = 1)\right) \geq \lambda\right)$$

where $\hat{y}_j^i$ is a prediction for the word $w_j^i$, where the word $w_j^i$ is part of a sequence $w^i$ of the new text 502, the prediction is a binary value indicating whether the word $w_j^i$ is an organizational element, and $p_\theta$ is a function determined based on a feature set identified from annotated training data (e.g., the function $p_\theta$ defined above with respect to FIG. 4). In an example, variables of the preceding equation are defined consistently with the variables defined above with respect to FIG. 4. The threshold $\lambda$ may be tuned using training data.

Based on the one or more models 510 selected and on the particular method of applying the selected model, the system 500 identifies organizational elements 512 (i.e., the "shell" used to organize the "meat" of the arguments of text 502). The organizational elements 512 may be processed for further applications, including content analysis applications and essay scoring applications. In one example application, the organizational elements 512 are received by a score determination module 514 and used to produce a score 516 associated with the text 502.

In certain examples, a performance of the one or more models 510 may be evaluated by comparing results of the one or more models 510 (i.e., annotations produced by the one or more models 510 identifying the organizational elements 512) to annotations produced by humans. In one example, performance of the one or more models 510 is measured at the word token-level using metrics including precision, recall, or the $F_1$ measure. For example, for the precision metric, a proportion of tokens predicted to be organizational elements by the one or more models 510 that were also labeled as organizational elements by humans is determined.

Figure 6:
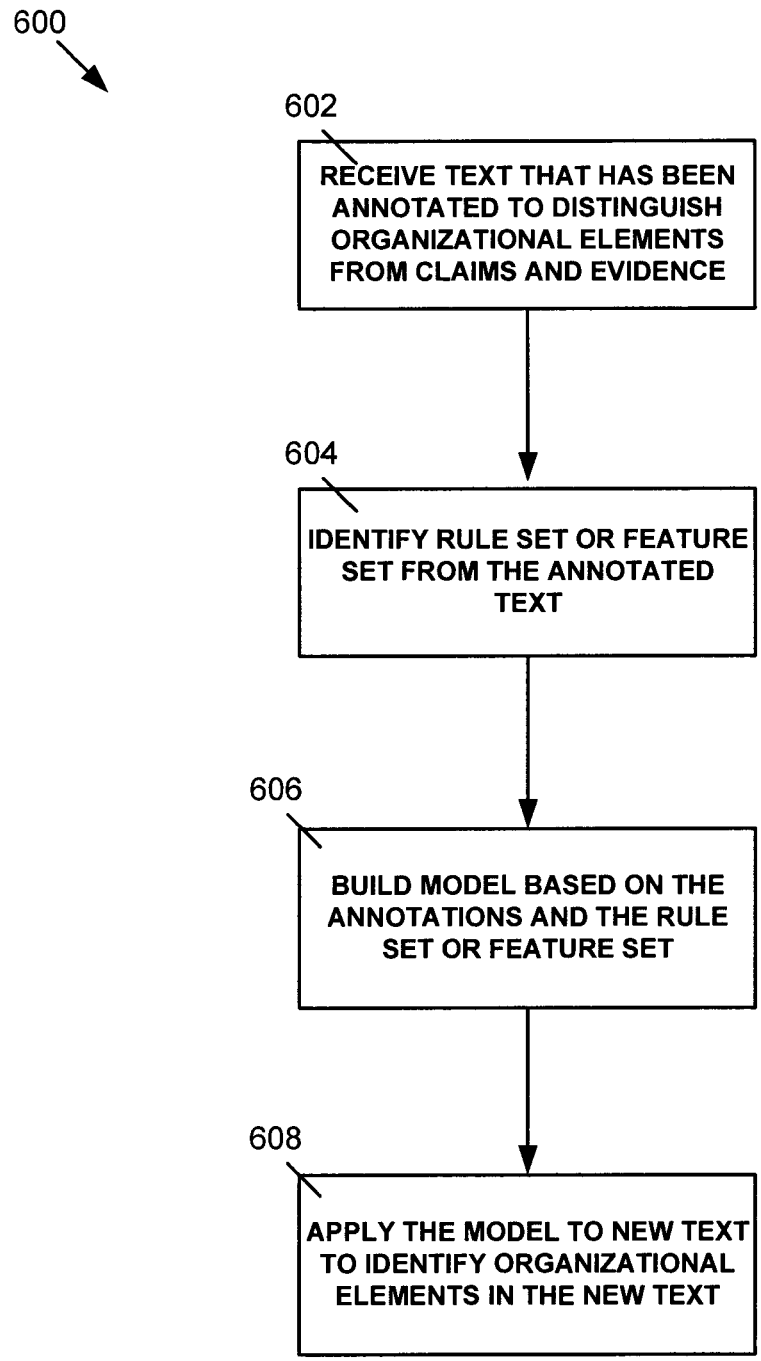
FIG. 6 is a flowchart depicting operations of an example method for identifying organizational elements in argumentative or persuasive discourse.

FIG. 6 is a flowchart 600 depicting operations of an example method for identifying organizational elements in argumentative or persuasive discourse. At 602, text that has been annotated to distinguish organizational elements from claims and evidence are received. The text includes argumentative or persuasive discourse and includes organizational elements and claims and evidence. At 604, a rule set or a feature set is identified from the annotated text. The rule set or feature set includes textual patterns or word frequency features related to the organizational elements of the annotated text. At 606, a model is built based on the annotations and the rule set or feature set. The model is configured to identify organizational elements in a new text. At 608, the model is applied to new text to identify organizational elements in the new text.

Figure 7A:
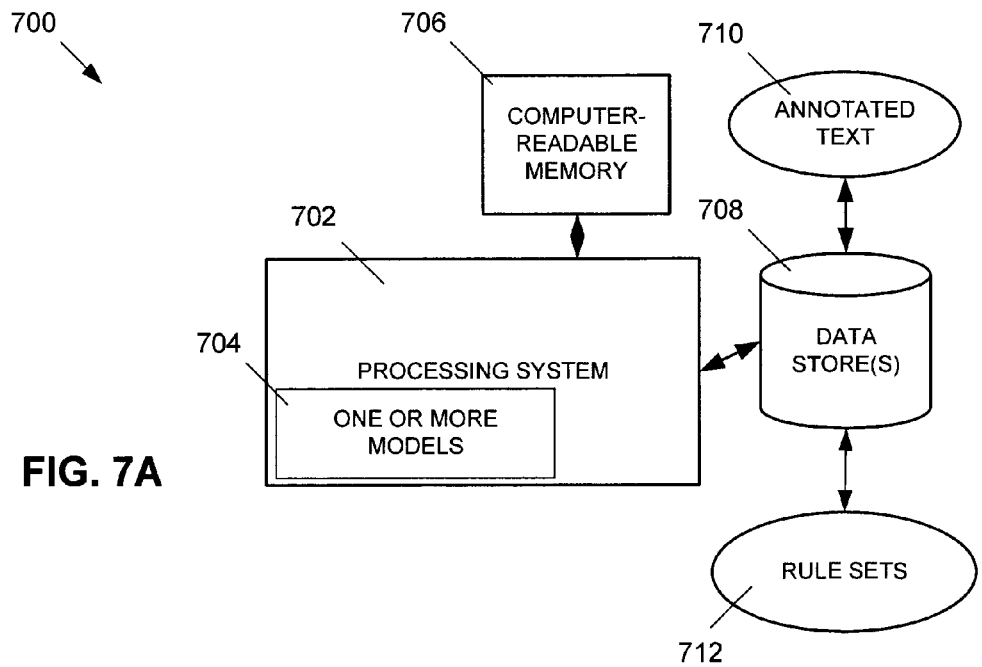
FIGS. 7A, 7B, and 7C depict example systems for use in identifying organizational elements in argumentative or persuasive discourse.
Figure 7B:
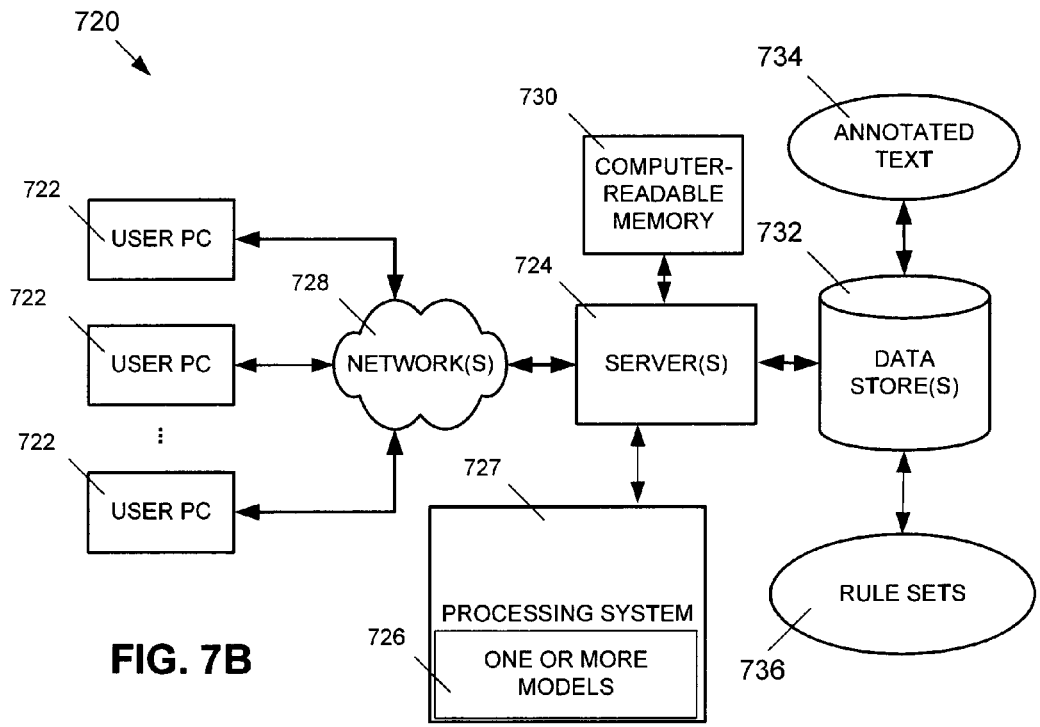
Figure 7C:
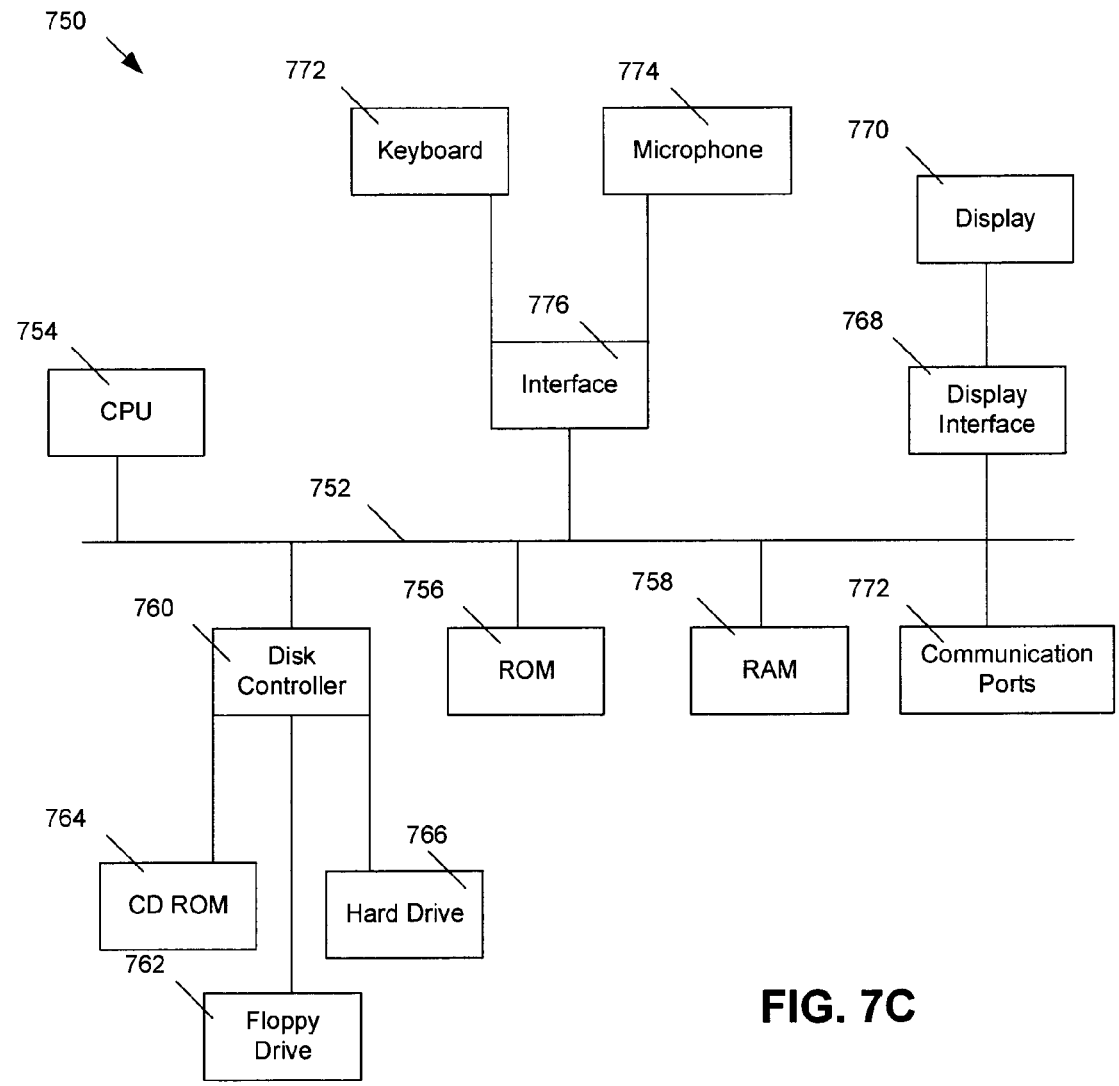

FIGS. 7A, 7B, and 7C depict example systems for use in identifying organizational elements in argumentative or persuasive discourse. For example, FIG. 7A depicts an exemplary system 700 that includes a standalone computer architecture where a processing system 702 (e.g., one or more computer processors located in a given computer or in multiple computers that may be separate and distinct from one another) includes one or more models 704 being executed on it. The processing system 702 has access to a computer-readable memory 706 in addition to one or more data stores 708. The one or more data stores 708 may include annotated text 710 as well as rule sets 712. The processing system 702 may be a distributed parallel computing environment, which may be used to handle very large-scale data sets.

FIG. 7B depicts a system 720 that includes a client-server architecture. One or more user PCs 722 access one or more servers 724 running one or more models 726 on a processing system 727 via one or more networks 728. The one or more servers 724 may access a computer-readable memory 730 as well as one or more data stores 732. The one or more data stores 732 may contain annotated text 734 as well as rule sets 736.

FIG. 7C shows a block diagram of exemplary hardware for a standalone computer architecture 750, such as the architecture depicted in FIG. 7A that may be used to contain and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method of identifying organizational elements in argumentative or persuasive discourse. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 706, 730, 756, 758 or data stores 708, 732, 762, 764, 766 may include one or more data structures for storing and associating various data used in the example systems for identifying organizational elements in argumentative or persuasive discourse. For example, a data structure stored in any of the aforementioned locations may be used to associate organizational elements and claims and evidence with a given annotated text. As another example, a data structure may be used to relate organizational elements identified in an unlabeled text with the unlabeled text. Further, the organizational elements and the unlabeled text may be associated with a score generated based on the organizational elements and other aspects of the unlabeled text. Other aspects of the example systems for identifying organizational elements in argumentative or persuasive discourse may be stored and associated in the one or more data structures (e.g., n-grams, textual patterns, and features identified in an annotated text).

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. The processor 754 may access one or more components as required.

A display interface 768 may permit information from the bus 752 to be displayed on a display 770 in audio, graphic, or alphanumeric format. Communication with external devices may optionally occur using various communication ports 772.

In addition to these computer-type components, the hardware may also include data input devices, such as a keyboard 773, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for identifying organizational elements in argumentative or persuasive discourse, the method comprising:

receiving, using a processing system comprising one or more data processors, text that has been annotated, the annotated text including argumentative or persuasive discourse in one or more annotation data structures that includes:

claims and evidence, and organizational elements configured to organize the claims and evidence, wherein annotations of the annotated text distinguish the organizational elements from the claims and evidence;

identifying a rule set or a feature set from the annotated text and storing the rule set or the feature set in a rule set data structure or a feature set data structure, the rule set or the feature set including textual patterns or word frequency features related to the organizational elements of the annotated text;

building a model based on the annotations and the rule set or the feature set, the model being configured to identify organizational elements in a new text, the model being stored in a model data structure; and applying the model to the new text, wherein the applying includes accessing the model data structure and determining whether a marginal probability for a word $w_j^i$ exceeds a threshold $\lambda$.

2. The method of claim 1, further comprising:
receiving the annotated text including the organizational elements, wherein the organizational elements refer to the claims and evidence and provide an organizational framework for the argumentative or persuasive discourse, and wherein the organizational elements:
declare claims of a writer, speaker, or author;
restate claims of an opponent of the writer, speaker, or author;
evaluate the claims of the opponent; or
present evidence and relate the evidence to particular claims.

3. The method of claim 1, further comprising:
building the model based on the feature set, wherein the feature set includes features based on the rule set and the textual patterns.

4. The method of claim 1, further comprising:
identifying the rule set from the annotated text, wherein the identifying includes:
identifying an n-gram in the annotated text that includes organizational elements, wherein the n-gram is a contiguous sequence of n items from the annotated text that is identified based on the annotations;
determining a textual pattern that describes the n-gram, wherein the textual pattern is an abstraction of the n-gram that includes parts of speech or word identifiers in a specific sequence; and
storing the textual pattern in the rule set.

5. The method of claim 4, further comprising:
determining the textual pattern that describes the n-gram, wherein the textual pattern describes more than one n-gram in the annotated text.

6. The method of claim 4, further comprising:
determining the textual pattern that describes the n-gram, wherein the parts of speech or word identifiers include a modal verb, an agree verb, an author noun, a verb, a noun, a pronoun, an adjective, an adverb, a proposition, a conjunction, or an interjection.

7. The method of claim 1, further comprising:
building the model based on the annotations and the rule set or the feature set, wherein the building includes maximizing an objective function, the objective function including terms corresponding to the textual patterns or word frequency features.

8. The method of claim 7, further comprising:
building the model based on the annotations and the rule set or the feature set, wherein the annotated text includes N examples (w, y) indexed by i, including sequences of words $w^i$ and sequences of labels $y^i$, with individual words and labels indexed by j, wherein $y^i$ is a sequence of binary values indicating whether each word $w_j^i$ in the sequence is an organizational element, and wherein the building includes:
determining a parameter vector θ that maximizes the objective function, wherein the objective function is defined as:

$$L(\theta \mid w, y) = \sum_{i=1}^{N} p_\theta(y^i \mid w^i),$$

where $p_\theta(y^i|w^i)$ is defined as:

$$p_\theta(y^i|w^i) = (\theta^T f(w^i, y^i) - \log Z),$$

where Z is a normalization constant that sums over all possible label sequences, and f is a feature function that takes pairs of word and label sequences and returns a vector of feature values equal in dimensions to the number of parameters in θ.

9. The method of claim 1, further comprising:
identifying the feature set from the annotated text, wherein the word frequency features include:
a relative frequency for a first word of the annotated text in a text corpus;
a first binary value identifying whether the relative frequency meets or exceeds a first threshold;
a number of different essay prompts in which the first word has appeared; or
a second binary value identifying whether the number of different essay prompts meets or exceeds a second threshold.

10. The method of claim 9, further comprising:
identifying the feature set from the annotated text, wherein features of the feature set include:
a third binary value identifying whether the first word includes only letters;
a fourth binary value identifying whether a rule-based system predicts the first word as being an organizational element;
a fifth binary value identifying whether the rule-based system predicts a second word as being an organizational element, wherein the second word immediately precedes the first word in the annotated text;
a sixth binary value identifying whether the first word occurs at the beginning of a sentence;
a seventh binary value identifying whether the first word occurs at the end of the sentence; or
an eighth binary value identifying a transition between a label applied to the first word and a label applied to the second word, wherein the first and the second labels indicate whether the first and the second words, respectively, are organizational elements.

11. The method of claim 1, further comprising:
applying the model to the new text, wherein the applying includes finding a most likely sequence of labels y given a sequence of words $w^i$ of the new text, wherein the most likely sequence of labels y is a vector including binary values indicating whether words of the sequence of words $w^i$ are organizational elements, and wherein the most likely sequence of labels y is determined using Viterbi decoding.

12. The method of claim 11, further comprising:
determining the most likely sequence of labels y using the Viterbi decoding according to a following equation:

$$\hat{y}^i = \underset{y}{\operatorname{argmax}}\ p_\theta(y \mid w^i),$$

where $\hat{y}^i$ is a sequence of predictions about the sequence of words $w^i$ of the new text, the predictions being binary values indicating whether the sequence of words $w^i$ includes organizational elements, and where $p_\theta$ is a function based on the rule set or the feature set from the annotated text.

13. The method of claim 1, further comprising:
determining whether the marginal probability for the word $w_j^i$ exceeds the threshold λ to determine a binary value $\hat{y}_j^i$, wherein the binary value $\hat{y}_j^i$ indicates whether the word $w_j^i$ is an organizational element, and wherein the binary value $\hat{y}_j^i$ is determined according to an equation:

$$\hat{y}_j^i = 1\left(\left(\sum_y p_\theta(y|w^i)1(y_j = 1)\right) \geq \lambda\right)$$

where $p_\theta$ is a function based on the rule set or the feature set from the annotated text, and where $w^i$ is a sequence of words with individual words and labels indexed by j.

14. The method of claim 1, further comprising:
    evaluating the model, the evaluating including:
        applying the model to the new text, wherein the applying includes generating a set of predictions using the model, and wherein the predictions identify organizational elements of the new text;
        comparing the predictions to labels generated by humans, wherein the labels identify organizational elements of the new text; and
        based on the comparing, evaluating the model using precision, recall, or $F_1$ measures.

15. The method of claim 1, further comprising:
    applying the model to the new text, wherein the model is applied to generate a score for the new text, and wherein the new text is an essay.

16. The method of claim 15, wherein the model includes a probability distribution based on the rule set or the feature set.

17. A system for identifying organizational elements in argumentative or persuasive discourse, the system comprising:
    a data processor; and
    computer-readable memory in communication with the data processor encoded with instructions for commanding the data processor to execute steps comprising:
        receiving text that has been annotated, the annotated text including argumentative or persuasive discourse in one or more annotation data structures that includes:
            claims and evidence, and
            organizational elements configured to organize the claims and evidence, wherein annotations of the annotated text distinguish the organizational elements from the claims and evidence;
        identifying a rule set or a feature set from the annotated text and storing the rule set or the feature set in a rule set data structure or a feature set data structure, the rule set or the feature set including textual patterns or word frequency features related to the organizational elements of the annotated text;
        building a model based on the annotations and the rule set or the feature set, the model being configured to identify organizational elements in a new text, the model being stored in a model data structure; and
        applying the model to the new text, wherein the applying includes accessing the model data structure and determining whether a marginal probability for a word $w_j^i$ exceeds a threshold $\lambda$.

18. The system of claim 17, wherein the steps further comprise:
    applying the model to the new text, wherein the model is applied to generate a score for the new text, and wherein the new text is an essay.

19. The system of claim 18, wherein the model includes a probability distribution based on the rule set or the feature set.

20. The system of claim 17, wherein the organizational elements:
    declare claims of a writer, speaker, or author;
    restate claims of an opponent of the writer, speaker, or author;
    evaluate the claims of the opponent; or
    present evidence and relate the evidence to particular claims.

21. The system of claim 17, wherein the steps further include:
    building the model based on the feature set, wherein the feature set includes features based on the rule set and the textual patterns.

22. The system of claim 17, wherein the steps further include:
    identifying the rule set from the annotated text, wherein the identifying includes:
        identifying an n-gram in the annotated text that includes organizational elements, wherein the n-gram is a contiguous sequence of n items from the annotated text that is identified based on the annotations;
        determining a textual pattern that describes the n-gram, wherein the textual pattern is an abstraction of the n-gram that includes parts of speech or word identifiers in a specific sequence; and
        storing the textual pattern in the rule set.

23. The system of claim 22, wherein the steps further include:
    determining the textual pattern that describes the n-gram, wherein the textual pattern describes more than one n-gram in the annotated text.

24. The system of claim 22, wherein the steps further include:
    determining the textual pattern that describes the n-gram, wherein the parts of speech or word identifiers include a modal verb, an agree verb, an author noun, a verb, a noun, a pronoun, an adjective, an adverb, a proposition, a conjunction, or an interjection.

25. The system of claim 17, wherein the steps further include:
    building the model based on the annotations and the rule set or the feature set, wherein the building includes maximizing an objective function, the objective function including terms corresponding to the textual patterns or word frequency features.

26. The system of claim 25, wherein the steps further include:
    building the model based on the annotations and the rule set or the feature set, wherein the annotated text includes N examples (w, y) indexed by i, including sequences of words $w^i$ and sequences of labels $y^i$, with individual words and labels indexed by j, wherein $y^i$ is a sequence of binary values indicating whether each word $w_j^i$ in the sequence is an organizational element, and wherein the building includes:
        determining a parameter vector $\theta$ that maximizes the objective function, wherein the objective function is defined as:

$$L(\theta|w, y) = \sum_{i=1}^{N} p_\theta(y^i|w^i),$$

where $p_\theta(y^i|w^i)$ is defined as:

$$p_\theta(y^i|w^i) = (\theta^T f(w^i, y^i) - \log Z),$$

where Z is a normalization constant that sums over all possible label sequences, and f is a feature function that takes pairs of word and label sequences and returns a vector of feature values equal in dimensions to the number of parameters in $\theta$.

27. The system of claim 17, wherein the steps further include:
  identifying the feature set from the annotated text, wherein the word frequency features include:
    a relative frequency for a first word of the annotated text in a text corpus;
    a first binary value identifying whether the relative frequency meets or exceeds a first threshold;
    a number of different essay prompts in which the first word has appeared; or
    a second binary value identifying whether the number of different essay prompts meets or exceeds a second threshold.

28. The system of claim 27, wherein the steps further include:
  identifying the feature set from the annotated text, wherein features of the feature set include:
    a third binary value identifying whether the first word includes only letters;
    a fourth binary value identifying whether a rule-based system predicts the first word as being an organizational element;
    a fifth binary value identifying whether the rule-based system predicts a second word as being an organizational element, wherein the second word immediately precedes the first word in the annotated text;
    a sixth binary value identifying whether the first word occurs at the beginning of a sentence;
    a seventh binary value identifying whether the first word occurs at the end of the sentence; or
    an eighth binary value identifying a transition between a label applied to the first word and a label applied to the second word, wherein the first and the second labels indicate whether the first and the second words, respectively, are organizational elements.

29. The system of claim 17, wherein the steps further include:
  applying the model to the new text, wherein the applying includes finding a most likely sequence of labels y given a sequence of words $w^i$ of the new text, wherein the most likely sequence of labels y is a vector including binary values indicating whether words of the sequence of words $w^i$ are organizational elements, and wherein the most likely sequence of labels y is determined using Viterbi decoding.

30. The system of claim 29, wherein the steps further include:
  determining the most likely sequence of labels y using the Viterbi decoding according to a following equation:

$$\hat{y}^i = \underset{y}{\operatorname{argmax}}\, p_\theta(y \mid w^i),$$

where $\hat{y}^i$ is a sequence of predictions about the sequence of words $w^i$ of the new text, the predictions being binary values indicating whether the sequence of words $w^i$ includes organizational elements, and where $p_\theta$ is a function based on the rule set or the feature set from the annotated text.

31. The system of claim 17, wherein the steps further include:
  determining whether the marginal probability for the word $w_j^i$ exceeds the threshold λ to determine a binary value $\hat{y}_j^i$, wherein the binary value $\hat{y}_j^i$ indicates whether the word $w_j^i$ is an organizational element, and wherein the binary value $\hat{y}_j^i$ is determined according to an equation:

$$\hat{y}_j^i = 1\left(\left(\sum_y p_\theta(y \mid w^i) 1(y_j = 1)\right) \geq \lambda\right)$$

where $p_\theta$ is a function based on the rule set or the feature set from the annotated text, and where $w^i$ is a sequence of words with individual words and labels indexed by j.

32. The system of claim 17, wherein the steps further include:
  evaluating the model, the evaluating including:
    applying the model to the new text, wherein the applying includes generating a set of predictions using the model, and wherein the predictions identify organizational elements of the new text;
    comparing the predictions to labels generated by humans, wherein the labels identify organizational elements of the new text; and
    based on the comparing, evaluating the model using precision, recall, or $F_1$ measures.

33. A non-transitory computer-readable storage medium for identifying organizational elements in argumentative or persuasive discourse, the computer-readable medium comprising computer executable instructions which, when executed, cause the computer system to execute steps comprising:
  receiving, using a processing system comprising one or more data processors, text that has been annotated, the annotated text including argumentative or persuasive discourse in one or more annotation data structures that includes:
    claims and evidence, and
    organizational elements configured to organize the claims and evidence, wherein annotations of the annotated text distinguish the organizational elements from the claims and evidence;
  identifying a rule set or a feature set from the annotated text and storing the rule set or the feature set in a rule set data structure or a feature set data structure, the rule set or the feature set including textual patterns or word frequency features related to the organizational elements of the annotated text;
  building a model based on the annotations and the rule set or the feature set, the model being configured to identify organizational elements in a new text, the model being stored in a model data structure; and
  applying the model to the new text, wherein the applying includes accessing the model data structure and determining whether a marginal probability for a word $w_j^i$ exceeds a threshold λ.

34. The storage medium of claim 33, wherein the steps further include:
  applying the model to the new text, wherein the model is applied to generate a score for the new text, and wherein the new text is an essay.

35. The storage medium of claim 34, wherein the model includes a probability distribution based on the rule set or the feature set.

36. The storage medium of claim 33, wherein the steps further include:
  building the model based on the feature set, wherein the feature set includes features based on the rule set and the textual patterns.

37. The storage medium of claim 33, wherein the steps further include:
  identifying the rule set from the annotated text, wherein the identifying includes:
    identifying an n-gram in the annotated text that includes organizational elements, wherein the n-gram is a contiguous sequence of n items from the annotated text that is identified based on the annotations;
    determining a textual pattern that describes the n-gram, wherein the textual pattern is an abstraction of the n-gram that includes parts of speech or word identifiers in a specific sequence; and
    storing the textual pattern in the rule set.

38. The storage medium of claim 37, wherein the steps further include:
  determining the textual pattern that describes the n-gram, wherein the textual pattern describes more than one n-gram in the annotated text.

39. The storage medium of claim 37, wherein the steps further include:
  determining the textual pattern that describes the n-gram, wherein the parts of speech or word identifiers include a modal verb, an agree verb, an author noun, a verb, a noun, a pronoun, an adjective, an adverb, a proposition, a conjunction, or an interjection.

40. The storage medium of claim 33, wherein the steps further include:
  building the model based on the annotations and the rule set or the feature set, wherein the building includes maximizing an objective function, the objective function including terms corresponding to the textual patterns or word frequency features.

41. The storage medium of claim 40, wherein the steps further include:
  building the model based on the annotations and the rule set or the feature set, wherein the annotated text includes N examples (w, y) indexed by i, including sequences of words $w^i$ and sequences of labels $y^i$, with individual words and labels indexed by j, wherein $y^i$ is a sequence of binary values indicating whether each word $w_j^i$ in the sequence is an organizational element, and wherein the building includes:
    determining a parameter vector θ that maximizes the objective function, wherein the objective function is defined as:

$$L(\theta \mid w, y) = \sum_{i=1}^{N} p_\theta(y^i \mid w^i),$$

where $p_\theta(y^i|w^i)$ is defined as:

$p_\theta(y^i|w^i)(\theta^T f(w^i, y^i) - \log Z),$ where Z is a normalization constant that sums over all possible label sequences, and f is a feature function that takes pairs of word and label sequences and returns a vector of feature values equal in dimensions to the number of parameters in θ.

42. The storage medium of claim 33, wherein the steps further include:
  identifying the feature set from the annotated text, wherein the word frequency features include:
    a relative frequency for a first word of the annotated text in a text corpus;
    a first binary value identifying whether the relative frequency meets or exceeds a first threshold;
    a number of different essay prompts in which the first word has appeared; or
    a second binary value identifying whether the number of different essay prompts meets or exceeds a second threshold.

43. The storage medium of claim 42, wherein the steps further include:
  identifying the feature set from the annotated text, wherein features of the feature set include:
    a third binary value identifying whether the first word includes only letters;
    a fourth binary value identifying whether a rule-based system predicts the first word as being an organizational element;
    a fifth binary value identifying whether the rule-based system predicts a second word as being an organizational element, wherein the second word immediately precedes the first word in the annotated text;
    a sixth binary value identifying whether the first word occurs at the beginning of a sentence;
    a seventh binary value identifying whether the first word occurs at the end of the sentence; or
    an eighth binary value identifying a transition between a label applied to the first word and a label applied to the second word, wherein the first and the second labels indicate whether the first and the second words, respectively, are organizational elements.

44. The storage medium of claim 33, wherein the steps further include:
  applying the model to the new text, wherein the applying includes finding a most likely sequence of labels y given a sequence of words $w^i$ of the new text, wherein the most likely sequence of labels y is a vector including binary values indicating whether words of the sequence of words $w^i$ are organizational elements, and wherein the most likely sequence of labels y is determined using Viterbi decoding.

45. The storage medium of claim 44, wherein the steps further include:
  determining the most likely sequence of labels y using the Viterbi decoding according to a following equation:

$$\hat{y}^i = \operatorname*{argmax}_{y} p_\theta(y \mid w^i),$$

where $\hat{y}^i$ is a sequence of predictions about the sequence of words $w^i$ of the new text, the predictions being binary values indicating whether the sequence of words $w^i$ includes organizational elements, and where $p_\theta$ is a function based on the rule set or the feature set from the annotated text.

46. The storage medium of claim 33, wherein the steps further include:
  determining whether the marginal probability for the word $w_j^i$ exceeds the threshold λ to determine a binary value $\hat{y}_j^i$, wherein the binary value $\hat{y}_j^i$ indicates whether the word $w_j^i$ is an organizational element, and wherein the binary value $\hat{y}_j^i$ is determined according to an equation:

$$\hat{y}_j^i = 1\left(\left(\sum_y p_\theta(y \mid w^i) 1(y_j = 1)\right) \geq \lambda\right)$$

where $p_\theta$ is a function based on the rule set or the feature set from the annotated text, and where $w^i$ is a sequence of words with individual words and labels indexed by j.

47. The storage medium of claim 33, wherein the steps further include:
   evaluating the model, the evaluating including:
      applying the model to the new text, wherein the applying includes generating a set of predictions using the model, and wherein the predictions identify organizational elements of the new text;
      comparing the predictions to labels generated by humans, wherein the labels identify organizational elements of the new text; and
      based on the comparing, evaluating the model using precision, recall, or $F_1$ measures.

* * * * *